Oct. 3, 1933.  I. J. SCALISI  1,929,120
PARACHUTE ATTACHMENT FOR AIRSHIPS
Filed April 25, 1932   2 Sheets-Sheet 1
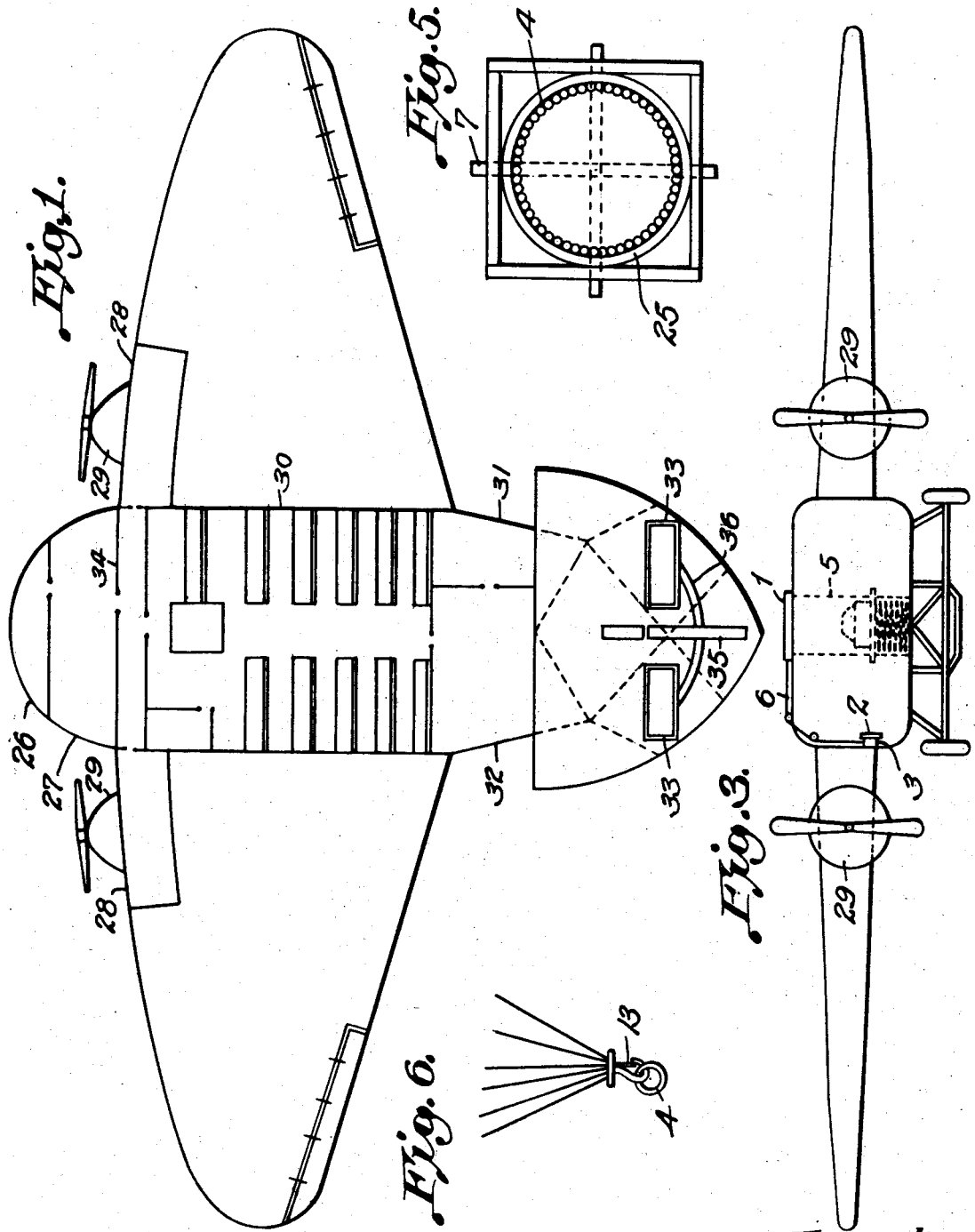
Inventor:
Ignazio J. Scalisi Oct. 3, 1933.  I. J. SCALISI  1,929,120
PARACHUTE ATTACHMENT FOR AIRSHIPS
Filed April 25, 1932   2 Sheets-Sheet 2
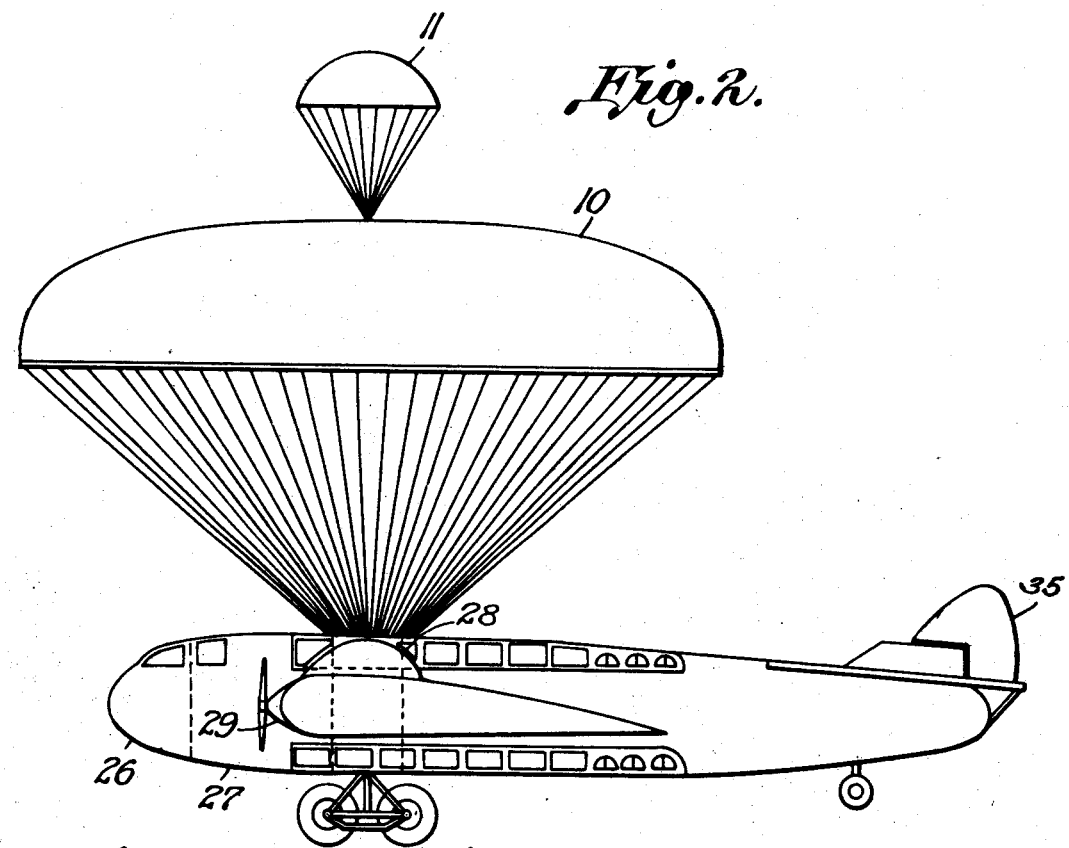
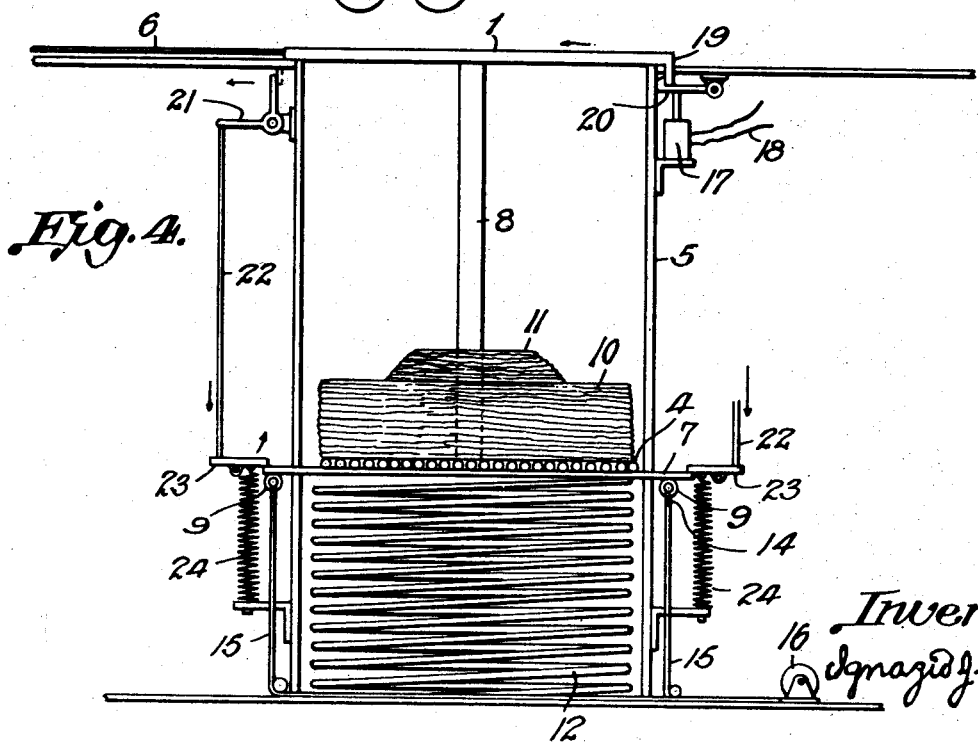
Inventor:
Ignazio J. Scalisi Patented Oct. 3, 1933

1,929,120

UNITED STATES PATENT OFFICE 1,929,120

PARACHUTE ATTACHMENT FOR AIRSHIPS

Ignazio J. Scalisi, Albany, N. Y.

Application April 25, 1932. Serial No. 607,471

2 claims. (Cl. 244—21)

1. The new features that I claim are as follows: The bat like wings, the pigeon like tail, the engines in the wings and space for the mechanics which extend two feet above the wings, the fifteen foot wide fuselage, and rudder which slides on a guide slot, and the wings in dead center of the fuselage.

2. I claim as my invention the bat like wings, regardless whether the wings are on top, bottom, or in the center of the fuselage as shown in Figure 2, and I also claim the fifteen foot wide fuselage for a plane of seventy-five foot width, or the increase of width of fuselage to the increase of width of wing span, according to scale of the drawings in which it has been illustrated and described in detail in Figure 1.

The pigeon-bat monoplane, appearing with parachute attachment, for which I have been granted a patent September sixteenth, 1924, application filed February eighteenth, 1924, Serial Number 693,430, Patent Number 1,509,032, is a parachute attachment for airships. My present invention is more simple and more efficient and keeps within my claims of said patent.

So, therefore, I desire to secure by Letters Patent: a patent for my invention known as the Pigeon-bat monoplane and parachute attachment for airships.

The present invention for which I am asking a patent relates to a parachute for airships and has for its object to provide a device of this character which embodies novel features of construction, whereby a collapsed parachute is normally housed in a tube container which is four feet in diameter and seven feet high, and is located in proper balance with respect to the plane, and can be quickly released and permitted to assume an operative position so that a safe landing can be made in event of an accident to the airship.

3. Further objects of the invention are to provide a parachute attachment for airships which is comparatively simple and inexpensive in its construction, which can be readily applied to an airship, which will not interfere in any manner with the flight and control of the airship under normal conditions, which can be quickly released in the event of an accident, and which will become distended as soon as released, so that the disabled airship will have a comparatively slow descent, and a safe landing can be made.

With the above and other objects in view the invention consists of certain combinations and arrangements of parts as will more fully appear as the description proceeds, the novel features therefore being pointed out in the appended claims.

For a full understanding of the invention reference is to be had to the following description and accompanying drawings in which:

Figure 1 is a top plan view of the pigeon-bat monoplane showing space for parachute, trap door in which to enter the fifteen foot wide fuselage, bat like wings and pigeon like tail and guide slot for rudder, 36. Figure 2 is a side elevation of the pigeon-bat monoplane which is equipped with a parachute attachment showing the parachute in operative position. Figure 3 is a front view of the pigeon-bat monoplane which shows the three foot thick wing, the fifteen foot wide fuselage and the sliding door 1 over the parachute tube container, and the spring tension to open the sliding door 3—2. Figure 4 is a detail of the parachute attachment. Figure 5 shows details of the structural steel framework from bottom to top of fuselage for parachute ring attachment. The steel plate construction number 25, is four feet in diameter and is welded to number 7—4. Figure 6 is a detail of the snap lock to which are tied five or six chute cords which can be unhooked from number 4 when the plane has made a safe landing so as to allow the parachute to be laid on the ground and folded before it will be stored again in the tube container 5.

Corresponding and like parts are referred to in the following description and indicated on all of the views of the drawings by like reference characters. For the purpose of illustration the invention is shown as applied to the pigeon-bat monoplane although it will be understood that it can be applied to any airship where it is desired to use a safety device of this kind.

Referring to the drawings, the reference numerals (1) designates the sliding door four feet square which will slide on ball bearings. The tension spring holder (2) contains the tension spring which opens the sliding door (1) by means of the cable (6). The tube container (5) for the chute is four feet in diameter and seven feet high. The guide lugs for the chute ring (7) travels in guides (8) of the steel framework. The rings (9) are fastened to the chute rings and are used to bring the parachute down in place in the tube container (5). There are two parachutes: a large one (10) which is 70 feet in diameter, and a small one (11) which is 15 feet in diameter. The large spring (12) will be eight feet high thereby giving tremendous sending power but when in place to receive the chute will be brought down to two and one half feet high. There are snap locks (13) to each of which are tied 5 or 6 chute cords. There are detachable hooks (14) which are fastened to winch ropes (15). These ropes are operated by a hand winch (16) for pulling down the large spring (12) into place.

In event of an accident the aviator will push a button control on the instrument board which is connected by wires (18) to the electro-magnet (17) which pulls down the holding dog (20) from the lug (19) on the bottom of the door. This lug (19) passes through lug guides (8) until it strikes and tips downward the lever (21) and rods (22) causing lever holding lugs (23) to release guide lugs for chute ring (7) allowing the large spring (12) to throw the chutes (10) and (11) into the air with terrific force. These chutes will then become distended by the air currents or from the speed of the plane or both and will assume an operative position as indicated in Figure 2. The steel plate construction (25) has attached to it the rings (4) for chute cords and the guide lugs (7) for chute ring which comes to rest at the top of the tube container when the parachute is in operative position as indicated in Figure 2. The rings (4), lugs (5), and the steel framework (25) are all welded as one piece to which is welded the large spring (12).

The pigeon-bat monoplane as shown in the accompanying drawings contains a navigation room (26), two pilots' rooms (27) and two mechanics' rooms (28) which extend two feet above the wings. The engines (29) are located in the wings. The staterooms (30) are for passengers and the kitchen (31) and dining compartment (32) are located in the fuselage. The elevators (33) are in the tail and the fuel tanks (34) are next to the pilot's room. The rudder (35) travels in the guide slot (36).

While one particular embodiment of the invention has been illustrated and described in detail, it will be understood that I do not restrict myself to the precise structural details shown, and that many modifications and changes can be made in the structural details without departing from the spirit of the invention. Having thus described my invention what I claim as new and desire to secure by Letters Patent is:

1. The combination with an airship including a supporting plane having a parachute receiving compartment arranged entirely between the normal surfaces thereof a slidable cover for said compartment which constitutes one of the surfaces of the plane when in the closed position, a magnetically operated release catch for releasing the slidable cover and for normally holding the cover in a closed position, spring means for sliding the cover in open position and discharge spring means for ejecting a parachute apparatus from said compartment.

2. A device as set forth in claim 1 including a parachute supporting member in said compartment cooperating with said discharge spring and mechanical means for returning the supporting member to its retracted position whereby said discharge spring is compressed.

IGNAZIO J. SCALISI.